United States Patent Office.

JONATHAN PENOYER, OF MASSILLON, OHIO.

Letters Patent No. 85,761, dated January 12, 1869.

IMPROVED MEDICAL COMPOUND.

The Schedule referred to in these Letters Patent and making part of the same.

*To all whom it may concern:*

Be it known that I, JONATHAN PENOYER, of Massillon, in the county of Stark, and State of Ohio, have invented a new and useful Medical Compound for the cure of the disease called piles, or hemorrhoids, to which compound I have given the name of "The Eureka Pile Remedy;" and I do hereby declare that the following is a full, clear, and exact description of the ingredients forming my compound, and of the proportions and mode of preparing the same, and the manner of using the compound, which will enable others skilled in the art to made and use my invention.

The two essential ingredients in my compound are, first, the fruit or meat of the common Brazil nut, so called in commerce, which nut is the fruit of the Brazilian tree, or *Bertholletia excelsa*, and is too well known to require particular description; and second, the *Phytolaccæ radix*, or what is commonly known as poke-root, which is a perennial root of an indigenous plant called the *Phytolacca decandra*, common in nearly all parts of the United States, and which is fully described in the United States Dispensatory, page 585, and being well known throughout the country, will not require further description here.

These two ingredients form the base of my compound, and although other ingredients are used for the purpose of putting the compound into a desirable form for medicine, yet I wish it understood that it is to the combining of these two ingredients that I attribute the efficacy of my compound, and that this combination, with about the proportions of these two ingredients hereinafter shown, constitutes the nature or gist of my invention, and is what I desire to secure as my invention.

My compound is usually put up for sale in the form of a tincture, or in the form of lozenges, the first being preferable where it is to be kept for a long time before using, and the latter being a convenient form for doctors' prescriptions.

The mode of preparing the tincture is as follows:

The meat of the Brazil nut is grated and pulverized, and then put into a press, which should be kept warm, and where it is to be subjected to a powerful pressure, which pressure will force out the oil of the nut, which is collected in any suitable vessel.

The oil so collected, is then "cut" with a sufficient quantity of alcohol to form a tincture. The amount of alcohol required for this purpose will generally be found to be about two parts of alcohol to one part of the nut-oil, but this proportion may be varied somewhat, according to the strength of the oil, enough being used to form a perfect tincture.

The meat of the poke-root is then grated and pulverized, and the oil expressed in a similar manner, or, if preferred, the oil may be distilled from the root.

The poke-root oil thus obtained, is then "cut" with alcohol, so as to form a tincture similar to that just described for the nut-oil.

These two tinctures having been thus obtained, are mixed together, in the proportion of one part of the poke-root tincture to sixteen parts of the Brazil-nut tincture, and the resulting compound is my pile-remedy in the form of a tincture.

To make lozenges of my compound, I grate and pulverize the meat of the Brazil nut and the poke-root, and then mix the grated and pulverized coarse powders thus obtained, in the proportion of one part of poke-root powder to sixteen parts of the Brazil-nut powder, which mixed powder forms the base of the lozenges, which are prepared by adding to the mass enough starch or gum-arabic and flour, to form a stiff paste, which is flavored with any desired flavoring-extract, and cut out into lozenges of any desired size and form, and which constitutes my pile-remedy in the lozenge-form.

It is to be observed that the grated-nut and root-powders are not deprived of their oil, except when the oil only is to be used, as in the case of the tincture-compound herein described; and further, that the compound may be prepared and used in various forms other than that of lozenges or tincture, or may be used in its oleaginous state, the compound, in whatever form prepared, containing one part of the grated poke-root powder or tincture to sixteen parts of the Brazil-nut powder or tincture.

The lozenges prepared as before stated are to be eaten like candy, whenever needed, in quantities of from six to ten, of the size of common candy-lozenges, during the day, which quantity or dose will of course be somewhat varied to suit the age of the patient or the violence of the disease, or according to the amount of other ingredients used with the compound in making the lozenges, and is a matter to be regulated by experience.

The ordinary dose for the tincture before described, is one teaspoonful taken three times a day, but this will of course be varied to suit the age and condition of the patient, and is to be regulated in a great measure by experience.

The effect of this compound of Brazil nut and poke-root, in whatever form presented to the patient, is a complete cure for the disease called "piles," or "hemorrhoids," in a period of one or more days, and this effect does not depend wholly on its specific power over the rectum, or fundament, but on the vigor and health which it imparts to the organs of digestion and assimilation, as well as to its alterative effects on the liver and kidneys.

Having thus fully described my invention, I wish it understood that although I have given what I consider to be the proper proportions to the two principal ingredients in my compound, as well as the best modes of preparing and administering the same, I reserve the right to vary therefrom, as experience may show to be necessary, as

What I claim as my invention, and desire to secure by Letters Patent, is—

The Eureka pile-remedy herein described, consisting essentially of the combination of the two principal ingredients, as is herein specified, and whether the same be or be not united with other ingredients, substantially as is herein specified.

As evidence that I claim the foregoing, I have hereunto set my hand, in the presence of two witnesses, this 25th day of November, A. D. 1868.

JONATHAN PENOYER.

Witnesses:
R. H. FOLGER,
ROBT. A. MUNCASTER.